United States Patent

Menne et al.

[11] Patent Number: 6,158,691
[45] Date of Patent: Dec. 12, 2000

[54] PROCESS FOR PREVENTING TURNING OVER DURING THE LANDING OF AN AIRCRAFT OR SPACECRAFT

[75] Inventors: Stefan Menne, Kolbermoor; Yasar Ovadya, Taufkirchen; Bernhard Schmidt, Unterhaching; Adalbert Wagner, Radthal, all of Germany

[73] Assignee: DaimlerChrysler AG, Germany

[21] Appl. No.: 09/032,280

[22] Filed: Feb. 27, 1998

[30] Foreign Application Priority Data

Feb. 28, 1997 [DE] Germany ................ 197 08 159

[51] Int. Cl.$^7$ .................................................. B64C 25/56
[52] U.S. Cl. .................... 244/100 A; 244/160; 244/107
[58] Field of Search ................ 244/100 A, 160, 244/107, 101, 138 R, 139; 180/116, 118, 121, 122

[56] References Cited

U.S. PATENT DOCUMENTS

| | | |
|---|---|---|
| 3,515,238 | 6/1970 | Knuth et al. . |
| 3,700,065 | 10/1972 | Eggington . |
| 3,727,716 | 4/1973 | Jenkins . |
| 3,738,597 | 6/1973 | Earl et al. . |

FOREIGN PATENT DOCUMENTS

| | | |
|---|---|---|
| 1237871 | 6/1959 | France ................ 244/138 R |
| 1 456 169 | 12/1968 | Germany . |
| 1 431 268 | 3/1969 | Germany . |
| 30 24 551 A1 | 1/1982 | Germany . |
| 33 23 348 C2 | 12/1988 | Germany . |
| 41 18 300 A1 | 12/1992 | Germany . |
| 44 22 617 C1 | 6/1995 | Germany . |
| 195 09 245 C1 | 3/1996 | Germany . |
| 842370 | 7/1960 | United Kingdom ........ 244/138 R |

*Primary Examiner*—Peter M. Doan
*Assistant Examiner*—Tien Dinh
*Attorney, Agent, or Firm*—McGlew & Tuttle, PC

[57] ABSTRACT

A process for preventing overturning during the landing of an aircraft or spacecraft using an air bag type landing impact-damping system, which is inflated with gas before the landing and from which gas is discharged via discharge valves during the landing. The process includes using as the air bag type landing impact-damping system a system that is divided into a plurality of chambers that can be inflated with gas and from which gas is released independently from one another, and that a pressure difference is generated during landing in the individual chambers of the air bag type landing impact-damping system.

20 Claims, 1 Drawing Sheet

PROCESS FOR PREVENTING TURNING OVER DURING THE LANDING OF AN AIRCRAFT OR SPACECRAFT

FIELD OF THE INVENTION

The present invention pertains to a process for preventing turning over during the landing of an aircraft or spacecraft, especially a manned or unmanned capsule or a guided missile, which is approaching the earth surface by braked or nonbraked fall or during flight by means of an air bag type landing impact-damping system, which is inflated with gas before the landing and from which gas escapes via discharge valves during the landing.

BACKGROUND OF THE INVENTION

A landing impact damper for missiles, whose velocity of descent during the landing process is determined by a brake parachute, and whose impact on the ground is reduced by the use of landing pads in the form of inflatable flexible tubes, has been known from DE-C-33 23 348. The landing pad comprises a plastically deformable tubular film, one end of which is pushed in and is pulled through the other end, so that an opening for introducing a pressurized gas is formed between the walls of the ends inserted into one another. At least two tubular films can be inserted into one another, and openings for introducing pressurized gas are formed between the walls of all ends inserted into one another, and the degree of filling of the individual tubular films can be set differently via valve elements, e.g., in a temperature-dependent manner. This impact pad offers increased lateral stability, so that the increase in pressure generated during the impact of the load is reduced by a plastic deformation of the material, and the load is extensively prevented from bouncing back.

Another impact pad for damping the shock of impact of aircraft rescue systems and other jettisoned loads has been known from DE-A-41 18 300. At least one pressure relief opening is provided, which opens automatically at a predetermined, defined overpressure and ensures the reduction of the pressure in the impact pad. An increase in pressure that is generated in the impact pad during the impact of an aircraft on the ground is thus reduced in order to likewise prevent a rebound effect.

Finally, DE-A-30 24 551 discloses a landing impact-damping system for loads returning from the air space, in which gas-filled damping members consisting of flexible material, which are folded up when not in use and are automatically filled with ambient air during unfolding by drawing in ambient air, are used, wherein damping members that briefly compress the air filling on impact on the ground and then blow it off are provided.

Besides these prior-art air bag systems, which are frequently used for landing aircraft, such as capsules, pallets, drones, etc., on parachutes, balloons or paragliders, so-called retrorockets, i.e., landing rockets, which generate a thrust directed opposite the force of gravity for a short time and brake the craft in question immediately before touchdown on the ground as a result, have been known as well. However, such systems with the fuel systems belonging to them are technically complicated, have a rather substantial space requirement, and appreciably increase the weight of the aircraft or spacecraft.

In contrast, the use of air bag type landing impact-damping systems offers the advantage that they are relatively lightweight, have a simple design and occupy little space in the inactive state. However, the drawback of all the prior-art air bag systems is that not only vertical velocity components, but also horizontal velocity components, which are generated, e.g., in the case of paragliders by wind or gliding directions, usually also must be damped with the air bag systems during the impact of the aircraft or spacecraft.

A suitable air bag type landing-damping system is a gas-filled, torus ring-shaped or rectangular gas container, which is inflated before landing. The desired damping action is achieved during impact by a medium, with which the air bag type landing-damping system is filled, i.e., air or another gas, being blown off during the landing proper, i.e., at the time of contact with the ground, as a function of the velocity of descent, the weight of the aircraft or spacecraft, and the desired braking. This can be achieved by opening suitable discharge valves.

However, the above-mentioned horizontal velocity components during landing mean a high risk of overturning of the aircraft or spacecraft, which is to be avoided especially in the case of missions with sensitive measuring instruments or the transportation of passengers.

SUMMARY AND OBJECTS OF THE INVENTION

The object of the present invention is to propose a process with which overturning during landing is avoided with certainty.

According to the invention, a process is provided for preventing overturning during the landing of an aircraft or spacecraft, especially a manned or unmanned capsule or a guided missile, which is approaching the earth surface by braked or nonbraked fall or during flight, by means of an air bag type landing impact-damping system, which is inflated with gas before landing and from which gas is discharged during the landing via discharge valves. The process includes using a system divided into a plurality of chambers that can be inflated with gas and from which gas is released independently from one another. A pressure difference is generated in the individual chambers of the air bag type landing impact-damping system during landing such that the chambers that are the front chambers when viewed in the direction of flight F have a higher gas pressure than the rear chambers.

The present invention is based on the discovery that the kinetic energy $\frac{1}{2} mv^2$ is converted by the compression of the air bag into pressure energy, i.e., into an increase in the pressure in the chambers and that a moment acting in direction $-Y$, which leads to the overturning of the landing body in the case of a sufficiently high horizontal velocity $V_x$ and thus to undesired damage to and deformations of the aircraft and spacecraft equipped with the air bag type landing impact-damping system, is built up by the frictional force occurring on ground contact during the landing, $$F_R = \mu \times F_N (F_N = \text{normal force}).$$

To avoid overturning, the moment acting in direction $-Y$ is to be opposed by a moment acting in the $+Y$ direction, so that overturning is prevented from occurring during landing.

This compensating moment acting in direction $+Y$ can be brought about by utilizing the compression energy and correspondingly controlling the state of the gas in the individual chambers. Consequently, to achieve the greatest possible moment, the pressure in the chambers that are the front chambers when viewed in the direction of flight must be as high as possible, and the pressure in the rear chambers must be as low as possible.

At the same time, the gas must flow out of the individual chambers after the maximum compression energy has been reached by opening the discharge valves in order to prevent the aircraft or spacecraft from bouncing back, i.e., to prevent the conversion of compression energy into kinetic energy and to thus prevent bounding back from occurring.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
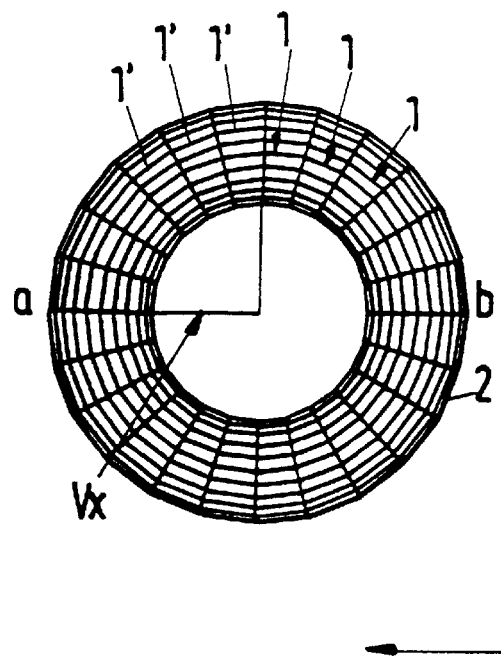
FIG. 1 is a bottom view of a torus-shaped air bag type landing impact-damping system.
Figure 2:
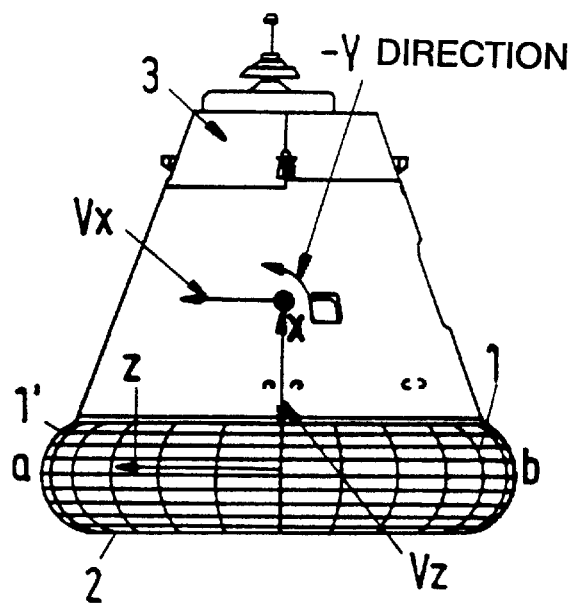
FIG. 2 is a schematic side view of this air bag type landing impact-damping system with an aircraft or spacecraft body fastened to it.

Referring to the drawings in particular, FIG. 1 shows a bottom view of an inflated torus-shaped air bag type landing-damping system, which is divided into a plurality of chambers, wherein the chambers that are the front chambers when viewed in the direction of flight are designated by 1', and the chambers located in the rear when viewed in the direction of flight are designated by 1. For illustration, the sections located in the front in the direction of flight F are designated by a and the sections located in the rear in the direction of flight F are designated by b in FIGS. 1 and 2.

The horizontal velocity component, which may lead to overturning of the landing aircraft or spacecraft body 3 without compensation, is designated by Vx in these two figures.

It is suggested according to the present invention that the same pressure, e.g., a pressure increased by +15 kPa over the ambient pressure, be admitted to all chambers 1, 1' of the air bag type landing impact-damping system 2 before landing, wherein all chambers are provided with discharge valves. In the case of an aircraft or spacecraft, which is approaching the ground without a preferential direction, e.g., a payload suspended on a parachute or balloon, which has no orientation in the horizontal direction, the corresponding discharge valves can be activated by means of pressure transducers, acceleration transducers (similar to those used in air bags in automobiles) or contact sensors, wherein the discharge valves are preferably actively controlled valves, which are activated by a triggering means, e.g., a pyrotechnic valve.

To prevent overturning, the discharge valves are actuated according to the present invention such that a pressure difference is set between the chambers 1' located in the front in the direction of flight F and the chambers 1 located in the rear in the direction of flight F such that the cambers 1' located in the front have a higher pressure during landing than the chambers 1 located in the rear. This can be achieved by various measures during landing, especially by:

opening the discharge valves of the rear chambers 1 already at a lower overpressure;

phase-shifted opening of the discharge valves, i.e., by the discharge valves of the rear chambers 1 opening sooner than the discharge valves of the front chambers;

activating a smaller discharge area in the discharge valves of the front chambers compared with the discharge valves of the rear chambers; and opening, e.g., only one discharge valve in the front chambers, while two (or more) discharge valves are opened in the rear chambers at the same time.

However, the air bag type landing impact-damping system according to the present invention is just as suitable for diminishing the impact in the case of aircraft and spacecraft with a preferential direction. For example, the payload suspended on a paraglider has basically an orientation in the horizontal direction of flight. This landing orientation is known from the very beginning, i.e., it is known that the craft suspended on a paraglider is positioned for landing with a known direction of flight in relation to the ground for landing; it is also possible to determine the preferential direction already before the landing and to maintain it, e.g., by position control or even by controlling an engine. The air bag system can be optimized in this case.

The air bag type landing impact-damping system 2 comprises a plurality of chambers 1, 1' in this case as well, and the pressure is admitted to the individual chambers according to the landing orientation. Each chamber is in turn equipped with discharge valves, which are triggered either by means of pressure transducers, acceleration transducers or contact sensors, if the discharge valves are actively controlled discharge valves, e.g., pyrotechnic valves, or at a defined overpressure in the case of passively controlled discharge valves, i.e., discharge valves with bursting disks.

Consequently, a pressure difference is set in the chambers 1' located in the front when viewed in the direction of flight F in this case as well, such that these chambers have a higher pressure than the chambers 1 located in the rear in the direction of flight F, which have a lower pressure. As was described above, this can be brought about during the landing by:

the discharge valves of the rear chambers 1 opening at a lower overpressure than the discharge valves of the front chambers 1';

the discharge valves opening in a phase-shifted manner, i.e., by the discharge valves of the rear chambers opening sooner than those of the front chambers; or by setting a smaller discharge cross section in the discharge valves of the front chambers compared with those of the rear chambers.

Figure 3:
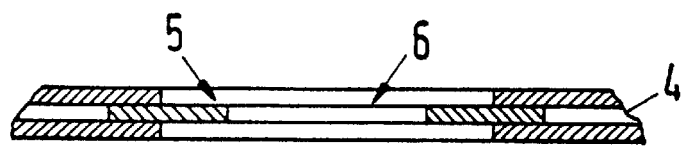
FIG. 3 is a partial cross sectional view taken through a discharge valve.

The adaptation of the discharge cross sections of the discharge valves 4 is shown in FIG. 3, wherein an adjustable diaphragm, by means of which the discharge cross section 6 for the gas can be adjusted, is designated by 5 there.

Another possibility of preventing aircraft and spacecraft with a preferential direction from overturning is to set the gas pressure in the front chambers 1' to a higher value already before the landing of the craft than in the rear chambers 1 or to use another gas for the front chambers 1' than for the rear chambers 1, in which case, e.g., air is selected for the front chambers and helium for the rear chambers, as a result of which different discharge velocities through the discharge valves can be achieved.

The gas pressure may also be increased by additionally igniting gas generators in the front area, which are triggered by the prior-art measures, either at the time of impact or shortly before, after the landing orientation has been determined.

While specific embodiments of the invention have been shown and described in detail to illustrate the application of the principles of the invention, it will be understood that the invention may be embodied otherwise without departing from such principles.

What is claimed is:

1. A process for preventing overturning during the landing of an aircraft or spacecraft or manned or unmanned capsule or a guided missile, which is approaching the earth surface by braked or nonbraked fall or during flight, comprising the steps of:

employing an air bag type landing impact-damping system, which is inflated with gas before landing and from which gas is discharged during the landing via discharge valves;

dividing said air bag type landing impact-damping system into a plurality of chambers;

inflating the chambers with gas and providing that said gas can be released independently from said chambers;

generating a pressure difference in said individual chambers of the air bag type landing impact-damping system during landing such that a chamber that is a front chamber when viewed in the direction of flight has a higher gas pressure than a rear chamber during the landing.

2. The process in accordance with claim 1, wherein a plurality of rear chambers are provided with discharge valves and a plurality of front chambers are provided with discharge valves, discharge valves associated with said rear chamber being activated to open at a lower overpressure than discharge valves associated with said front chamber.

3. The process in accordance with claim 1, wherein a plurality of rear chambers are provided with discharge valves and a plurality of front chambers are provided with discharge valves, said discharge valves of said rear chamber being activated such that they open sooner than the discharge valves of said front chambers.

4. The process in accordance with claim 1, wherein a plurality of rear chambers are provided with discharge valves and a plurality of front chambers are provided with discharge valves, discharge valves of the chambers being activated such that more gas is discharged from said rear chambers than from said front chambers.

5. The process in accordance with claim 1, wherein a plurality of rear chambers are provided with discharge valves and a plurality of front chambers are provided with discharge valves, different gas pressures are set in the front and rear chambers before the landing.

6. The process in accordance with claim 1, wherein a plurality of rear chambers are provided with discharge valves and a plurality of front chambers are provided with discharge valves and before landing, the front and rear chambers are filled with different gases, which have different discharge velocities.

7. The process in accordance with claim 1, further comprising using a discharge valve for said front chamber and a discharge valve for said rear chamber wherein a discharge valve associated with said rear chamber is activated to open at a lower overpressure than a discharge valve associated with said front chamber.

8. The process in accordance with claim 1, further comprising using a discharge valve for said front chamber and a discharge valve for said rear chamber wherein the discharge valve of said rear chamber is activated such that it opens sooner than the discharge valves of said front chamber.

9. The process in accordance with claim 1, further comprising using a discharge valve for said front chamber and a discharge valve for said rear chamber wherein the discharge valves are activated such that more gas is discharged from said rear chamber than from said front chamber.

10. The process in accordance with claim 1, further comprising using a discharge valve for said front chamber and a discharge valve for said rear chamber wherein, said front chamber having a discharge cross section dimension and said rear chamber having a discharge cross section dimension which is different from said front chamber discharge cross section dimension.

11. The process in accordance with claim 10, wherein said setting of the discharge cross sections is controlled by the number of discharge valves.

12. The process in accordance with claim 1, further comprising using a discharge valve for said front chamber and a discharge valve for said rear chamber wherein different gas pressures are set in the front and rear chambers before the landing.

13. The process in accordance with claim 1, further comprising using a discharge valve for said front chamber and a discharge valve for said rear chamber wherein before landing, the front and rear chambers are filled with different gases, which have different discharge velocities.

14. A process for landing a vehicle from the air to a surface, the process comprising the steps of:

providing a plurality of air bag chambers on the vehicle between the vehicle and the surface;

determining a direction of landing of the vehicle with respect to the surface;

dividing said plurality of air bag chambers into a first chamber set and a second air bag chamber set, said first chamber set being in a front of the vehicle with respect to said direction of landing, said second chamber set being in a rear of the vehicle with respect to said direction of landing;

landing the vehicle onto the surface;

inflating said plurality of air bag chambers during said landing of the vehicle onto the surface;

controlling a pressure in said first and second air bag chamber sets during said landing to cause said first chamber set to have a higher pressure than a pressure of said second chamber set.

15. The process in accordance with claim 14, wherein:

said controlling of said pressure varies said pressure in said first and second chamber sets to prevent the vehicle from overturning during said landing.

16. The process in accordance with claim 14, wherein:

said controlling of said pressure includes providing a sensor for detecting landing conditions of the vehicle during said landing and varying said pressure in said first and second chamber sets dependent on said sensor to prevent the vehicle from overturning during said landing.

17. The process in accordance with claim 16, wherein:

said sensor includes one of a pressure transducer, an acceleration transducer, and a contact sensor.

18. The process in accordance with claim 14, wherein:

said landing generates an overturning force;

said controlling of said pressure includes adjusting said pressure in said first and second chamber sets to generate a compensating force opposing said overturning force.

19. The process in accordance with claim 14, wherein:

said first and second chamber sets have substantially identical pressure prior to contact of the vehicle onto the surface.

20. The process in accordance with claim 19, wherein:

said controlling of said pressure includes causing said pressure in said first chamber set to be larger than said pressure in said second chamber set during a ground contact portion of said landing.

* * * * *